United States Patent
Hillaert et al.

(10) Patent No.: US 9,636,948 B2
(45) Date of Patent: May 2, 2017

(54) LUGGAGE ARTICLE WITH CANTILEVERED WHEEL BRACKET HAVING ELONGATED ARMS

(71) Applicant: Samsonite IP Holdings S.ar.I., Luxembourg (LU)

(72) Inventors: Rik Hillaert, Oudenaarde (BE); Vivien Cheng, De Pinte (BE); Wim De Vos, Zingem (BE); Jean-Claude Vandewalle, Zarlardinge (BE)

(73) Assignee: Samsonite IP Holdings S.a.r.l., Luxembourg (LU)

( * ) Notice: Subject to any disclaimer, the term of this patent is extended or adjusted under 35 U.S.C. 154(b) by 0 days.

(21) Appl. No.: 14/514,737

(22) Filed: Oct. 15, 2014

(65) Prior Publication Data

US 2015/0102573 A1 Apr. 16, 2015

(30) Foreign Application Priority Data

Oct. 15, 2013 (EP) .................................... 13188762

(51) Int. Cl.
*A45C 5/14* (2006.01)
*B60B 33/00* (2006.01)
*B60B 33/04* (2006.01)

(52) U.S. Cl.
CPC ............ *B60B 33/0028* (2013.01); *A45C 5/14* (2013.01); *B60B 33/045* (2013.01); *A45C 2005/148* (2013.01); *B60B 2200/45* (2013.01); *Y10T 16/184* (2015.01)

(58) Field of Classification Search
CPC .............. B60B 33/006; B60B 33/0023; B60B 33/0081
See application file for complete search history.

(56) References Cited

U.S. PATENT DOCUMENTS

| | | | |
|---|---|---|---|
| 2,086,557 A | 7/1937 | Kaptuller | |
| 2,738,542 A | 3/1956 | Clark, Jr. | |
| 2,830,545 A * | 4/1958 | Robinson et al. | ............ 105/170 |

(Continued)

FOREIGN PATENT DOCUMENTS

| | | |
|---|---|---|
| CA | 2720562 A1 | 10/2009 |
| CN | 201194600 Y | 2/2009 |

(Continued)

OTHER PUBLICATIONS

Extended European Search Report dated Aug. 5, 2014, Application No. 13188762.2, 5 pages.

*Primary Examiner* — Hau Phan
*Assistant Examiner* — Jacob Meyer
(74) *Attorney, Agent, or Firm* — Dorsey & Whitney LLP (57) ABSTRACT

A luggage article may include a plurality of walls together defining an outer structure of the luggage article, a wheel bracket attached to and extending from one of the walls, and a wheel attached to the wheel bracket. The wheel bracket may comprise first and second elongate arms extending along a common side of the wheel. The first and second arms may be vertically-spaced apart from one another over at least a portion of the length of the first and second arms. The configuration of the wheel bracket may result in higher shock absorption and reduced wheel noise comparative to conventional wheel brackets, and offer an improvement and alternative to conventional luggage wheel brackets.

21 Claims, 8 Drawing Sheets

(56) References Cited

U.S. PATENT DOCUMENTS

| | | | |
|---|---|---|---|
| 2,914,340 A | 11/1959 | Black | |
| 2,923,961 A * | 2/1960 | Black | 16/44 |
| 2,942,290 A | 6/1960 | Segal | |
| 2,987,752 A * | 6/1961 | Black | 16/44 |
| 3,102,744 A | 9/1963 | Reuter et al. | |
| 3,214,786 A * | 11/1965 | Butsch | 16/41 |
| 3,222,708 A * | 12/1965 | Butsch | 16/41 |
| 4,027,898 A * | 6/1977 | Steen | 280/124.116 |
| 4,336,629 A * | 6/1982 | Jarvis et al. | 16/35 R |
| 4,392,668 A * | 7/1983 | Mulholland | 280/86.1 |
| 4,403,784 A | 9/1983 | Gray | |
| 4,422,212 A | 12/1983 | Sheiman et al. | |
| 4,649,595 A | 3/1987 | Shane | |
| 4,759,097 A | 7/1988 | Black | |
| 5,533,231 A | 7/1996 | Bai | |
| 5,967,535 A * | 10/1999 | King | 280/47.38 |
| 6,357,793 B1 * | 3/2002 | Dickie et al. | 280/755 |
| 6,409,196 B1 * | 6/2002 | McFarland | 280/250.1 |
| 6,478,315 B1 | 11/2002 | Manesis | |
| 6,478,316 B1 * | 11/2002 | Wagner | 280/37 |
| 6,532,623 B1 * | 3/2003 | Watanabe | 16/35 D |
| 6,539,578 B1 | 4/2003 | Guttmann et al. | |
| 6,776,428 B2 * | 8/2004 | Strong | 280/124.128 |
| 6,789,810 B2 * | 9/2004 | Strong | 280/124.128 |
| 6,892,421 B2 * | 5/2005 | Cooper et al. | 16/44 |
| 6,908,087 B2 * | 6/2005 | Wintersgill et al. | 280/33.991 |
| 7,210,690 B2 * | 5/2007 | Tan | 280/47.38 |
| 7,213,818 B2 * | 5/2007 | Chang | 280/47.38 |
| 7,497,449 B2 * | 3/2009 | Logger | 280/47.38 |
| 7,657,969 B2 * | 2/2010 | Trivini | 16/45 |
| 7,744,102 B2 * | 6/2010 | Bailey et al. | 280/47.38 |
| 7,891,051 B2 * | 2/2011 | Chou | 16/35 R |
| 8,452,508 B2 * | 5/2013 | Frolik et al. | 701/70 |
| 8,490,243 B2 * | 7/2013 | Guo et al. | 16/35 R |
| 8,662,516 B1 * | 3/2014 | Slagerman | 280/250.1 |
| 8,752,243 B2 * | 6/2014 | Guo et al. | 16/35 R |
| 8,783,700 B2 * | 7/2014 | Li | 280/124.128 |
| 8,806,714 B2 * | 8/2014 | Eguchi | 16/35 R |
| 8,807,584 B2 * | 8/2014 | Lasher, III | 280/242.1 |
| 9,044,656 B2 * | 6/2015 | Zhang | 16/45 |
| 2002/0069479 A1 * | 6/2002 | Kuo | 16/45 |
| 2002/0144375 A1 * | 10/2002 | Drucker et al. | 16/18 R |
| 2004/0111830 A1 * | 6/2004 | Cooper et al. | 16/44 |
| 2006/0043688 A1 * | 3/2006 | Chang | 280/47.38 |
| 2007/0056141 A1 * | 3/2007 | Armano et al. | 16/35 R |
| 2007/0119661 A1 * | 5/2007 | Chang | 188/1.12 |
| 2008/0007022 A1 * | 1/2008 | Jones | 280/124.13 |
| 2008/0116660 A1 * | 5/2008 | Nicholls | 280/286 |
| 2009/0031533 A1 * | 2/2009 | Yan | 16/35 R |
| 2011/0168508 A1 | 7/2011 | Jiang | |
| 2012/0005858 A1 * | 1/2012 | Lai | 16/45 |
| 2012/0086193 A1 * | 4/2012 | Guo et al. | 280/788 |
| 2012/0255141 A1 * | 10/2012 | Lin et al. | 16/45 |
| 2012/0311821 A1 * | 12/2012 | Eguchi | 16/35 R |
| 2013/0093155 A1 | 4/2013 | Gong | |
| 2013/0205544 A1 | 8/2013 | Dayt et al. | |
| 2014/0232077 A1 * | 8/2014 | Zhang | 280/47.34 |
| 2014/0262661 A1 * | 9/2014 | Mathieu et al. | 190/18 A |
| 2016/0286914 A1 | 10/2016 | Hillaert et al. | |

FOREIGN PATENT DOCUMENTS

| | | |
|---|---|---|
| CN | 101443201 B | 12/2010 |
| CN | 201675239 U | 12/2010 |
| CN | 202278929 U | 6/2012 |
| CN | 102578778 A | 7/2012 |
| CN | 202407510 U | 9/2012 |
| CN | 202528768 U | 11/2012 |
| CN | 102991559 A | 3/2013 |
| CN | 202782503 U | 3/2013 |
| DE | 20309968 U1 | 8/2003 |
| EM | 001175822-0002 | 4/2009 |
| EP | 0051995 A1 | 11/1986 |
| EP | 1117311 A1 | 7/2001 |
| FR | 2763285 A1 | 11/1998 |
| FR | 2799179 A1 | 4/2001 |
| GB | 450893 A | 7/1936 |
| JP | 2013237446 A | 11/2013 |
| WO | 2007118102 A1 | 10/2007 |

* cited by examiner

LUGGAGE ARTICLE WITH CANTILEVERED WHEEL BRACKET HAVING ELONGATED ARMS

CROSS-REFERENCE TO RELATED APPLICATION

This application claims priority to European Patent Application No. 13188762.2, filed on Oct. 15, 2013 and entitled "Luggage Article With Cantilevered Wheel Bracket Having Elongated Arms", which is hereby incorporated in its entirety by reference as though fully disclosed herein.

TECHNICAL FIELD

The present disclosure relates generally to a wheeled luggage article and particularly to a luggage article with a cantilevered wheel bracket having elongated arms.

BACKGROUND

Luggage items and in particular luggage cases (i.e., suitcases) conventionally include wheels attached to the case to allow the case to be pulled along. Brackets attach the wheels to the cases. Each bracket supports one or more wheels and generally permits the one or more wheels to rotate about a horizontal axis. Each bracket may be fixed about a vertical axis to prevent the one or more wheels from swiveling about the vertical axis (generally referred to as fixed wheels) or may be rotational about the vertical axis to permit swiveling of the one or more wheels about the vertical axis (generally referred to as spinner wheels).

The design of such wheels and wheel assemblies for luggage articles presents a particularly unique challenge. Specifically the wheels must be robust enough to withstand use under heavy loading of the case and transport over rough surface as well as when the case is dropped on its wheels. On other hand the wheels must also be light and compact so as to maximize the weight and volume that the luggage article can carry for a given overall size and weight. The wheels must also be simple and relatively cheap to produce and assemble to minimize cost.

A further problem that has been identified with conventional cases is that the wheel brackets generally transfer shock loads from the wheels to the cases and may be noisy as well. As such, the shock loads commonly are transferred through the case, disturb the arrangement of one's belongings, and/or cause damage to the belongings. The noise may be an annoyance and may make the use of the luggage case unpleasant.

It is therefore desirable to provide an improved luggage article, and more specifically an improved wheel bracket that addresses the above described problems and/or which more generally offers improvements or an alternative to existing arrangements.

Documents that may be related to the present disclosure in that they include various wheel brackets are: CN102578778, CN201194600, CN201675239, CN202278929, CN202407510, CN20528768, EP001175822-0002, EP0051995, US20110168508, U.S. Pat. Nos. 2,738,542, 2,914,340, 2,923,961, 2,942,290, 2,987,752, 4,392,668, 4,422,212, and 6,478,315.

SUMMARY

According to the present disclosure there is therefore provided a luggage article as described in the accompanying claims.

In an embodiment of the invention, a luggage article may include a plurality of walls together defining an outer structure of the luggage article and one or more wheel assemblies attached to and extending from one of the walls. The one or more wheel assemblies may include a wheel bracket attached to and extending from one of the walls and a wheel attached to the wheel bracket. The wheel bracket may include a first arm and a second arm extending along a common side of the wheel and vertically-spaced apart from one another over at least a portion of the length of the first and second arms.

The first and second arms may have different bending stiffness. The first arm may be positioned directly above the second arm. The first and second arms may converge toward one another as the first and second arms approach a central axis of the wheel. The first and second arms may form a cantilevered wheel mount that extends at least partially around a central axis of the wheel. The cantilevered wheel mount may be positioned within a hub insert, and a wheel axle may pass through the hub insert. The first and second arms may be solid or single-stranded wire. The first arm may be arcuate, and the second arm may be straight or substantially straight. The first and second arms may be formed as a single component or piece. The first and second arms each may define a notch, and the support member may include a support member insert having multiple prongs that engage the notches to interlock the first and second arms to the support member. The first and second arms may have different lengths between the support member and a central axis of the wheel. The second arm may extend from the support member toward the central axis of the wheel in a straight or substantially straight line. The end portions of the first and second arms may be rotatable relative to the support member.

The wheel bracket may further comprise a support member that receives end portions of the first and second arms, and the end portions may be vertically-spaced apart from one another. The support member may define a wheel abutment that is adapted to contact a circumferential surface of the wheel, thereby limiting the wheel travel of the wheel and the resilient deformation of the first and second arms. The wheel bracket may include third and fourth elongate arms that extend along an opposing side of the wheel relative to the first and second arms. The first, second, third, and fourth arms may be formed as a single component. The wheel bracket and the wheel may form part of a spinner wheel assembly.

In an embodiment of the invention, a wheel assembly for a luggage article may include a wheel bracket and a wheel attached to the wheel bracket. The wheel bracket may include a first arm and a second arm extending along a common side of the wheel and vertically-spaced apart from one another over at least a portion of the length of the first and second arms.

The present disclosure advantageously provides a luggage article with a shock absorbing wheel bracket having spaced-apart, elongate arms that extend along a common side of a wheel. The elongate arms may include an upper end portion attached to a support or strut member and a lower end portion forming a cantilevered wheel hub or mount. One of the elongate arms may have a lower bending stiffness than the other of the elongate arms. As such, during operation, the elongate arm with the lower bending stiffness may bend, buckle, or flex to resiliently absorb impact energy (such as vibrational loads), while the elongate arm with the higher bending stiffness may pivot about an attachment point to provide a consistent or substantially consistent radial arm for the wheel. The bending stiffness of the elongate arms may be varied by the type of material, the cross-sectional size of the arms, and/or the profile and/or relative geometric shape of the elongate arms. In the examples described below and depicted in FIGS. 1-17, the bending stiffness of the elongate arms is varied primarily by the profile or shape of the elongate arms, reducing manufacturing cost as the elongate arms may be manufactured from the same raw material and formed into the appropriate profile or shape based on the desired respective bending stiffness of the wheel bracket. The wheel bracket advantageously may provide improved shock absorption and/or rolling noise reduction compared to conventional luggage articles.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

The present disclosure will now be described by way of example only with reference to the following figures in which.

DETAILED DESCRIPTION

Figure 1:
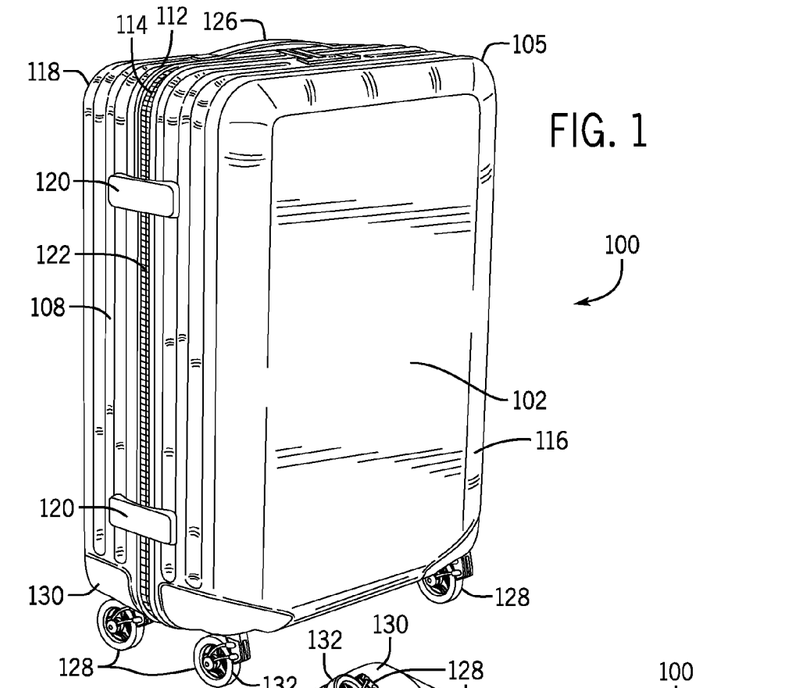
FIG. 1 is a schematic front perspective view of a luggage article according to an embodiment of the invention.
Figure 2:
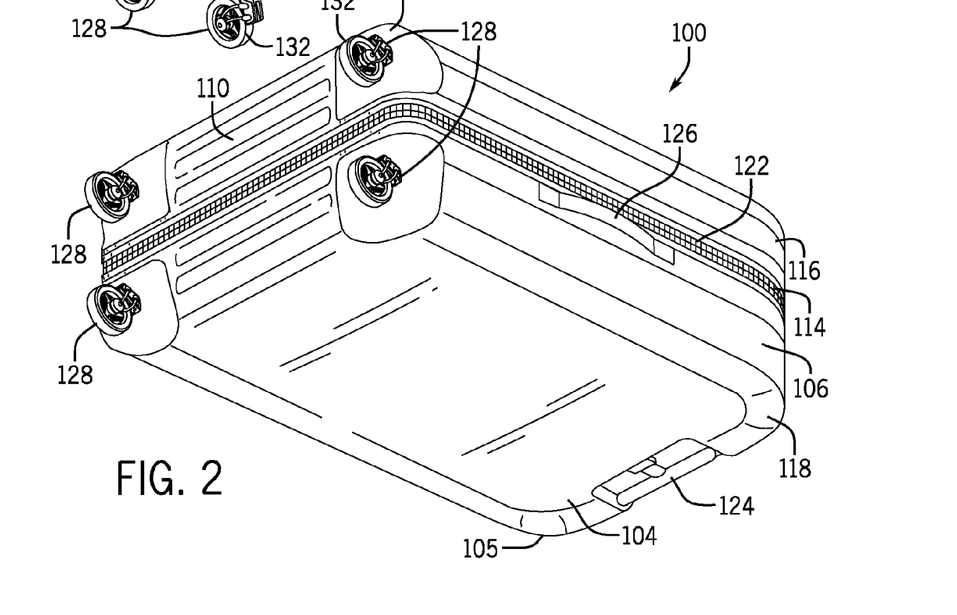
FIG. 2 is a schematic rear view of a luggage article shown in FIG. 1.

Referring to FIGS. 1 and 2, a wheeled luggage article 100 according to an example of the invention includes a generally cuboid structure 105 formed from a plurality of walls 102,104,106,108,110,112 defining an enclosed internal volume of the luggage article 100 in which to carry a user's belongings. The luggage article 100 includes opposing front and rear walls 102,104, opposing side walls 106,108, and opposing top and bottom end walls 110,112 that collectively define a housing or outer structure 105 of the luggage article 100. The luggage article 100 may be a bag, a case, or other luggage articles. The luggage article 100 may be hard and/or soft sided.

The luggage article 100 may be split along an opening line 114 into a lid section 116, which includes the front wall 102, and a base section 118, which includes the rear wall 104. The lid section 116 may be connected to the base section 118 along a portion of a side of the article 100 via a hinge 120 in a conventional manner, and the luggage article 100 may be opened at the opening line 114 to access the internal volume. The hinge 120 may be formed of a zipper 122 and a fabric strip, a piano hinge, discrete hinges spaced apart, or an articulating joint. The piano hinge, the discrete hinges, or the articulating joint may be made from metal, plastic, any other suitable material, or any combination thereof. The hinge 120 may be stitched to the lid 116 and also to the base 118, or may be coupled in another suitable manner. A zipper 122 along a periphery of the opening line 114 or other conventional closure arrangement, for example clamp locks, may secure the lid section 116 to the base section 118 to close the luggage article 100.

The luggage article 100 may include at least one handle. The depicted luggage article 100 includes a telescoping tow handle 124 associated with the top wall 112. The depicted case also includes fixed carry handles 126 attached to the top wall 112 and the side wall 106. The telescoping handle 124 and the fixed carry handles 126 may be associated with any wall of the luggage article 100.

The luggage article 100 may include at least one wheel assembly 128. The depicted luggage article 100 includes four wheel assemblies 128 mounted from the bottom end wall 110 of the case 110. Each spinner wheel assembly 128 is located proximate a bottom end corner of the article 100. In other words, each spinner wheel assembly 128 is located on the bottom end wall 110 of the case near an intersection of one of the front and rear walls 102,104 and one of the side walls 106,108 of the article 100. The spinner wheel assemblies 128 may be spaced apart from one another by substantially the width and/or depth of the article 100.

Figures 3, 4:
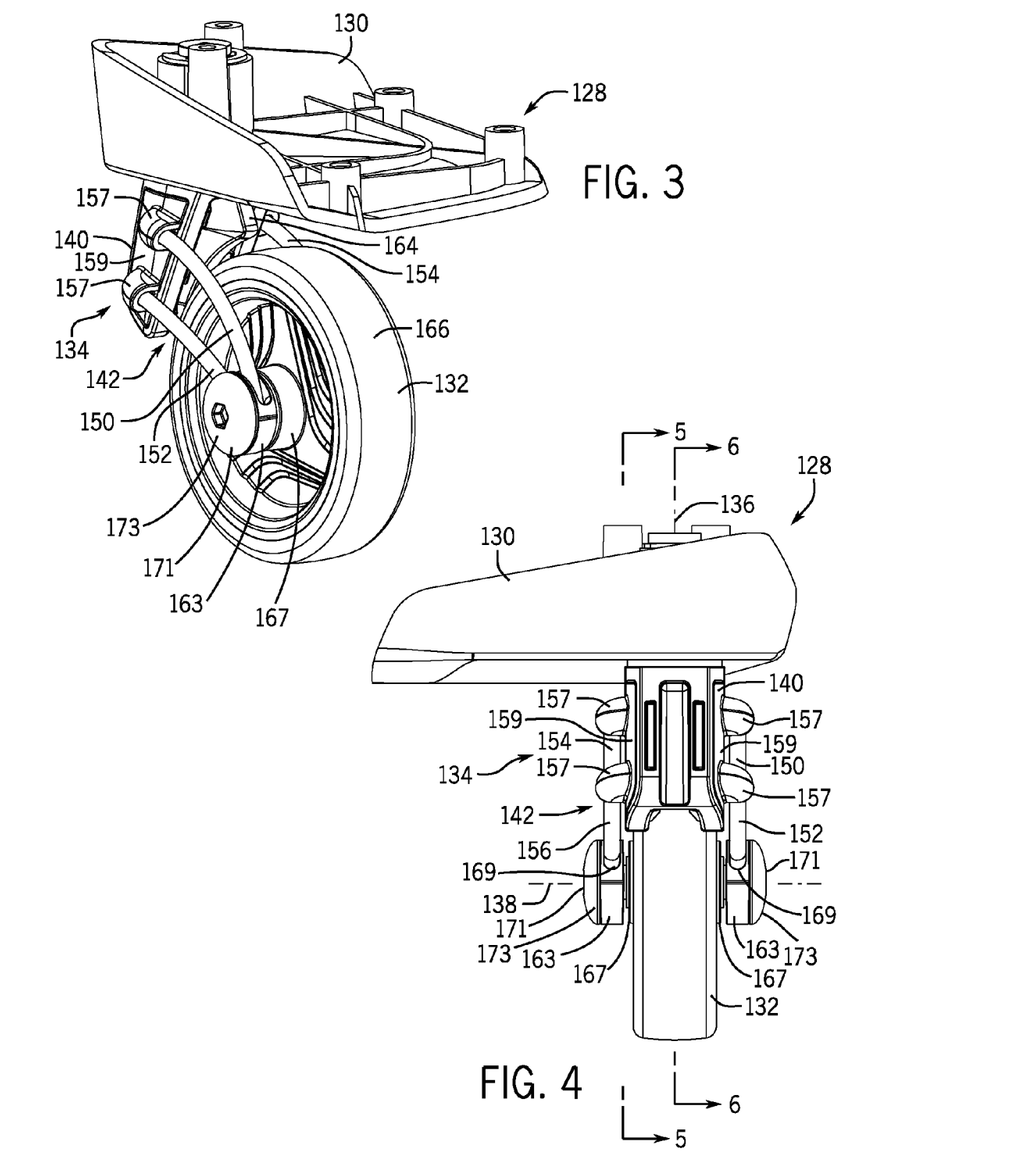
FIG. 3 is a schematic rear perspective view of a wheel assembly of a luggage article shown in FIG. 1.
FIG. 4 is a schematic front elevation view of a wheel assembly shown in FIG. 3 of a luggage article shown in FIG. 1.

Referring to FIGS. 1 to 3, each spinner wheel assembly 128 may include a wheel mount 130, one or more wheels 132, and a wheel bracket 134. The wheel mount 130 generally attaches the wheel bracket 134 to the luggage article 100. The wheel mount 130 may be attached to the corners of the article 100 formed by the intersection of any three adjacent walls. In other embodiments the wheel mount 130 may be attached to the article 100 at other locations. The bracket 134 may be rotationally mounted to the bottom end wall 110 of the luggage article 100 via the wheel mount 130 to rotate about a generally vertical spinner axis 136 (see FIGS. 4 and 6) oriented perpendicular to the bottom end wall 110 of the article 100. A single wheel 132 (although a pair of wheels may be provided in other embodiments) may be rotationally mounted to the wheel bracket 134 to rotate about a wheel axis 138 (see FIG. 4), which is generally horizontal and parallel to the bottom wall 110 of the luggage article 100. Such an arrangement allows the spinner wheels 132 to rotate about two orthogonal axes: the vertical spinner axis 136 and the horizontal wheel axis 138. The spinner wheel assemblies 128 support the luggage article 100 in a vertical upright orientation relative to a support surface and generally allows the article 100 to be wheeled along the support surface in a stable upright orientation as shown in FIG. 1. In other embodiments, the luggage article 100 may include at least one wheel having a fixed vertical axis and configured to allow rolling movement of the luggage case.

Figure 5:
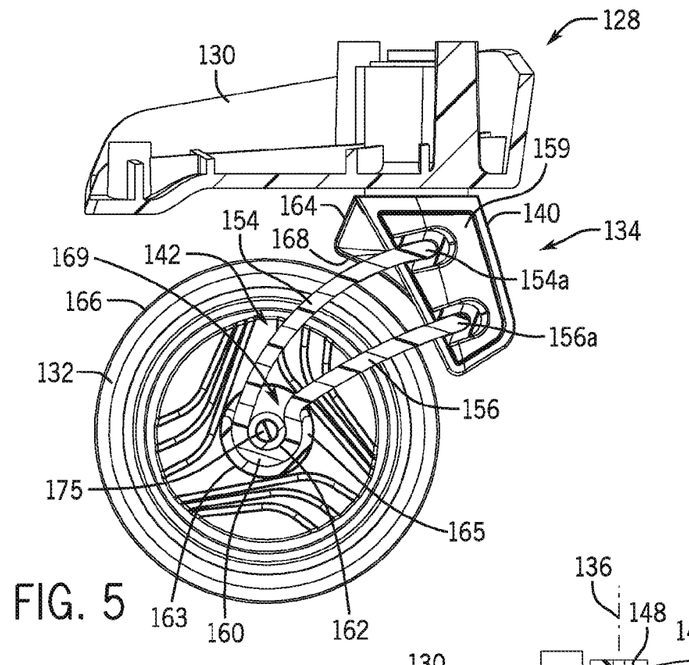
FIG. 5 is a schematic cross-section view of a wheel assembly shown in FIG. 3 of a luggage article shown in FIG. 1 taken along the line 5-5 shown in FIG. 4.
Figure 6:
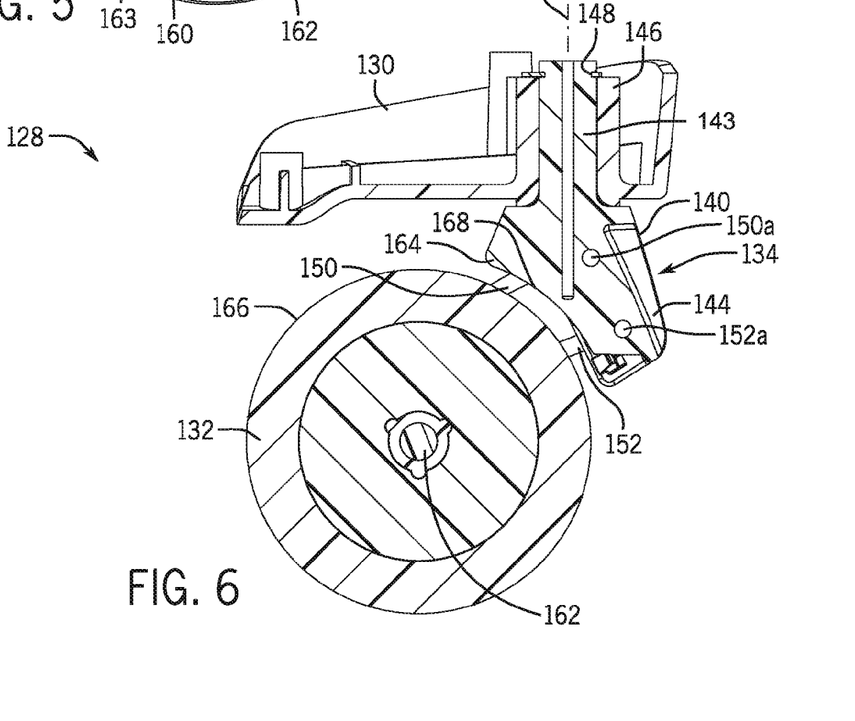
FIG. 6 is a schematic cross-section view of a wheel assembly shown in FIG. 3 of a luggage article shown in FIG. 1 taken along the line 6-6 shown in FIG. 4.

Referring to FIGS. 3-6, the wheel bracket 134 may include two main components: a support member 140 and a suspension member 142. The support member 140 may be vertically fixed, but swivelable, relative to the wheel mount 130. As shown in FIG. 6, an upper portion 143 of the support member 140 may be received within and rotatably bear against an inner surface of an upwardly-extending sleeve 146 that is formed as part of the wheel mount 130, and a lower portion 144 of the support member 140 may be positioned beneath the wheel mount 130. To limit or prevent vertical displacement of the support member 140 relative to the wheel mount 130, a fastener, such as the c-clip 148 shown in FIG. 6, may be received within an annular groove formed in the upper portion 143 and abut against an upper surface of the sleeve 146, and an annular, upper shoulder of the lower portion 144 of the support member 140 may abut against a lower surface of the wheel mount 130. The support member 140 may be metallic, non-metallic, or both. In some implementations, the support member 140 is formed from steel, titanium, plastic, or other suitable materials.

Figure 7:
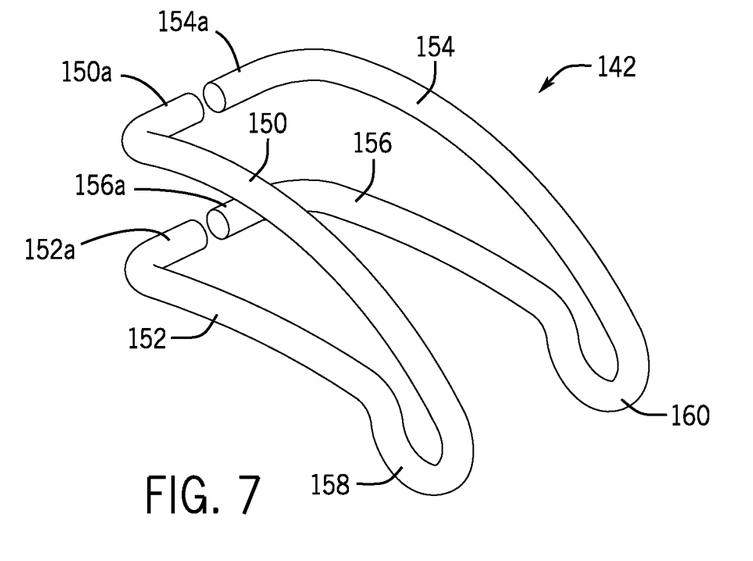
FIG. 7 is a schematic perspective view of a wire bracket of a wheel assembly shown in FIG. 3 of a luggage article shown in FIG. 1.

Referring to FIGS. 3-7, the suspension member 142 may include first and second elongate arms 150, 152 extending along one axial side of the wheel 132. The first and second elongate arms 150, 152 may absorb, attenuate, or dampen impact loads (such as vibrational loads) imparted on the wheel 132, thereby reducing the forces transferred to the outer structure 105. The first and second elongate arms 150, 152 may be metallic, non-metallic, or both. For example, the first and second elongate arms 150, 152 may be formed from spring steel, titanium, plastic, or other suitable materials. The first and second elongate arms 150, 152 may be formed from solid or single-stranded wire. In one preferred implementation, the elongate arms 150, 152 are metal wires formed from spring steel. The first and second arms 150, 152 may be formed as one piece as shown in FIG. 7, or alternatively may be formed as separate pieces and joined together with a hub connector.

With continued reference to FIGS. 3-7, the first and second elongate arms 150, 152 may be cantilevered from the lower portion 144 of the support member 140. The support member 140 may receive end portions 150a, 152a of the first and second arms 150, 152. The end portions 150a, 152a may be vertically-spaced apart from one another and may extend at least partially into one side of the lower portion 144 of the support member 140. Each end portion 150a, 152a may be rotatable (rotationally free) relative to the support member 140. The support member 140 may include individual arm coverings or housings 157 that extend laterally from the sides of the support member 140 and surround a portion of the first and second arms 150, 152 to restrain lateral movement of the end portions 150a, 152a of the arms 150, 152 relative to the support member 140. The arm coverings 157 may be formed as part of a support member insert 159, which may be interference fit or otherwise attached to the support member 140.

From the end portions 150a, 152a, the first and second elongate arms 150, 152 may extend downwardly away from the support member 140. The first and second arms 150, 152 may be vertically-spaced apart from one another over at least a portion of the length of the first and second arms 150, 152 (see FIGS. 3 and 7). The first arm 150 may be positioned directly above the second arm 152, and the first and second arms 150, 152 may converge toward one another as the first and second arms 150, 152 approach the central axis 138 of the wheel 132. Near the central axis 138 of the wheel 132, the first and second arms 150, 152 may form a first cantilevered wheel hub or mount 158 for receiving an end of a wheel axle 162. The wheel mount 158 may extend at least partially around the central axis 138 of the wheel 132.

The wheel mount 158 may be received within a hub insert 163 that holds the wheel mount 158 wrapped around the wheel axle 162. The hub insert 163 may be positioned outwardly from a hub 167 of the wheel 132 coaxially along the central axis 138 of the wheel 132 (see FIGS. 3 and 4). The hub insert 163 may be ring-shaped and may include an outer portion 165 that extends radially around a majority of the wheel mount 158. The outer portion 165 may define a neck opening or portion 169 that opens to an internal space of the hub insert 163 and permits passage of the elongate arms 150, 152.

The hub insert 163 may be secured to the wheel axle 162 by a hub fastener 171. The hub fastener 171 may include a head portion 173 and a shank portion 175 extending from an underside of the head portion 173. The head portion 173 may abut against an outer surface of the hub insert 163, and the shank portion 175 may pass through the hub insert 163 and engage the wheel axle 162 to attach the hub insert 163 to the hub 167 of the wheel 132. The head portion 173 may define a hexagonal socket or other engagement feature for engagement with a tool, such as a hexagonal key. The shank portion 175 may be externally threaded for engagement with an internally-threaded end portion of the wheel axle 162.

To attach the first and second arms 150, 152 to the wheel 132, the wheel mount 158 may be pressed through the neck portion 169 of the hub insert 163 and positioned in the internal space of the hub insert 163. The wheel mount 158 may be interference fit within the hub insert 163 such that the wheel mount 158 abuts against an inner surface of the hub insert 163 and rotates in unison with the hub insert 163 about the central axis 138 of the wheel 132. The wheel mount 158 and the hub insert 163 may be mounted onto an end portion of the axle 162 such that the wheel mount 158 is positioned radially between the wheel axle 162 and the outer portion 165 of the hub insert 163. To positively locate the hub insert 163 along the central axis 138 of the wheel 132, the shank portion 175 of the hub fastener 171 may be threaded into engagement with the internally-threaded end portion of the axle 162 until the head portion 173 of the hub fastener 171 abuts against a confronting surface of the hub insert 163, thereby securing the hub insert 163 along the wheel axis 138 adjacent to the hub 167 of the wheel 132.

The first and second arms 150, 152 may have different flexural rigidity or bending stiffness relative to one another. The flexural rigidity or bending stiffness of the first and second arms 150, 152 may be varied by the type of material, the cross-sectional size of the arms, and/or the relative geometric profile or shape of the elongate arms. In FIGS. 1-10, the flexural rigidity or bending stiffness of the first and second arms 150, 152 is varied primarily by the profile or shape of the arms 150, 152, reducing manufacturing cost as the elongate arms may be manufactured from the same raw material.

Referring to FIGS. 3-7, the second arm 152 has a larger bending stiffness than the first arm 150 based primarily on the relative geometric profiles or shapes of the first and second arms 150, 152. The second arm 152 extends in a straight line or a substantially straight (slightly curved) line from the support member 140 toward the central axis 138 of the wheel 132, whereas the first arm 150 extends in an arcuate or curved path from the support member 140 toward the central axis 138 of the wheel 132. In this configuration, the second arm 152 determines the travel path of the wheel 132 and pivots about the attachment point of the second arm 152 to the support member 140, and the first arm 150 resiliently bends, buckles, or flexes as the second arm 152 pivots, thereby providing a spring function that absorbs impact energy such as vibrations.

With further reference to FIGS. 3-7, the suspension member 142 may include third and fourth elongate arms 154, 156 extending along an opposing axial side of the wheel 132 relative to the first and second elongate arms 150, 152. The third and fourth elongate arms 154, 156 may be cantilevered from the lower portion 144 of the support member 140. The third and fourth elongate arms 154, 156 may be separated laterally from the first and second elongate arms 150, 152 such that the third and fourth arms 154, 156 extend along an opposing side of the support member 140 relative to the first and second elongate arms 150, 152. When attached to the support member 140, the suspension member 142 may be symmetrical about a vertical plane bisecting the support member 140.

The support member 140 may receive end portions 154*a*, 156*a* of the third and fourth arms 154, 156. The end portions 154*a*, 156*a* may be vertically-spaced apart from one another and may extend at least partially into an opposing side of the lower portion 144 of the support member 140 relative to the end portions 150*a*, 152*a* of the first and second arms 150, 152. As such, the end portions 154*a*, 156*a* of the third and fourth arms 154, 156 may confront the end portions 150*a*, 152*a* of the first and second arms 150, 152. Each end portion 154*a*, 156*a* may be rotatable (rotationally free) relative to the support member 140. The support member 140 may include individual arm coverings or housings 157 that extend laterally from the sides of the support member 140 and surround a portion of the third and fourth arms 154, 156 to restrain lateral movement of the end portions 154*a*, 156*a* of the arms relative to the support member 140.

From the end portions 154*a*, 156*a*, the third and fourth elongate arms 154, 156 may extend downwardly away from the support member 140 in a uniformly-spaced relationship with the first and second elongate arms 150, 152 (see FIGS. 3, 4, and 7). The third and fourth arms 154, 156 may be vertically-spaced apart from one another over at least a portion of the length of the third and fourth arms 154, 156 (see FIGS. 5 and 7). The third arm 154 may be positioned directly above the fourth arm 156, and the third and fourth arms 154, 156 may converge toward one another as the third and fourth arms 154, 156 approach the central axis 138 of the wheel 132. Near the central axis 138 of the wheel 132, the third and fourth arms 154, 156 may form a second cantilevered wheel mount 160 for receiving an opposing end of the wheel axle 162 relative to the first cantilevered wheel mount 160. The wheel mount 160 may extend at least partially around the central axis 138 of the wheel 132, and the wheel mount 160 may be attached to an opposing end portion of the wheel axle 162 relative to the wheel mount 158 with a hub insert 163 and hub fastener 171 as described above in relation to the wheel mount 158. As shown in FIG. 7, the third and fourth arms 154, 156 may be integrally-formed as a single component. In some implementations, the first arm 150, the second arm 152, the third arm 154, and the fourth arm 156 are formed from a single wire as one piece. In other implementations, the first arm 150, the second arm 152, the third arm 154, and the fourth arm 156 are formed from four separate wire pieces and joined together by hub connectors positioned on opposing sides of the wheel 132.

The third and fourth arms 154, 156 may have different flexural rigidity or bending stiffness relative to one another. The flexural rigidity or bending stiffness of the third and fourth arms 154, 156 may be varied by the type of material, the cross-sectional size of the arms, and/or the relative geometric profile or shape of the elongate arms. In FIGS. 1-10, the flexural rigidity or bending stiffness of the third and fourth arms 154, 156 is varied primarily by the profile or shape of the arms 154, 156, reducing manufacturing cost as the elongate arms may be manufactured from the same raw material.

Referring to FIGS. 3-7, the fourth arm 156 may be more rigid than the third arm 154. The fourth arm 156 may extend in a straight line or a substantially straight (slightly curved) line from the support member 140 toward the central axis 138 of the wheel 132, whereas the third arm 154 may extend in an arcuate or curved path from the support member 140 toward the central axis 138 of the wheel 132. In this configuration, the fourth arm 156 determines the travel path of the wheel 132 and pivots about the attachment point of the fourth arm 156 to the support member 140, and the third arm 154 resiliently bends, buckles, or flexes as the fourth arm 156 pivots, thereby providing a spring function that absorbs impact energy such as vibrations.

Referring to FIGS. 3, 5, and 6, the wheel 132 may abut directly against the support member 140 to limit the maximum deflection of the wheel 132 and the arms 150, 152, 154, 156. The support member 140 may include a wheel abutment 164 adapted to contact a circumferential surface 166 of the wheel 132 to limit deformation of the arms 150, 152, 154, 156 and/or wheel travel of the wheel 132. The wheel abutment 164 may include a curved brake surface 168 having a curvature that substantially corresponds to or matches a circumference of the wheel 132 (see FIGS. 5 and 6). The curved inner surface 168 of the wheel abutment 164 is adapted to contact the outer circumferential surface 166 of the wheel 132, thereby providing a positive stop to the travel of the wheel 132 and preventing plastic deformation of the arms 150, 152, 154, 156 (see FIG. 8). The arms 150, 152, 154, 156 may be designed such that the brake surface 168 of the wheel abutment 164 only contacts the circumferential surface 166 of the wheel 132 when the luggage article 100 is loaded over a weight capacity of the article 100 and a sufficiently large impact force is imparted on the article 100, the wheel 132, or both.

Figure 8:
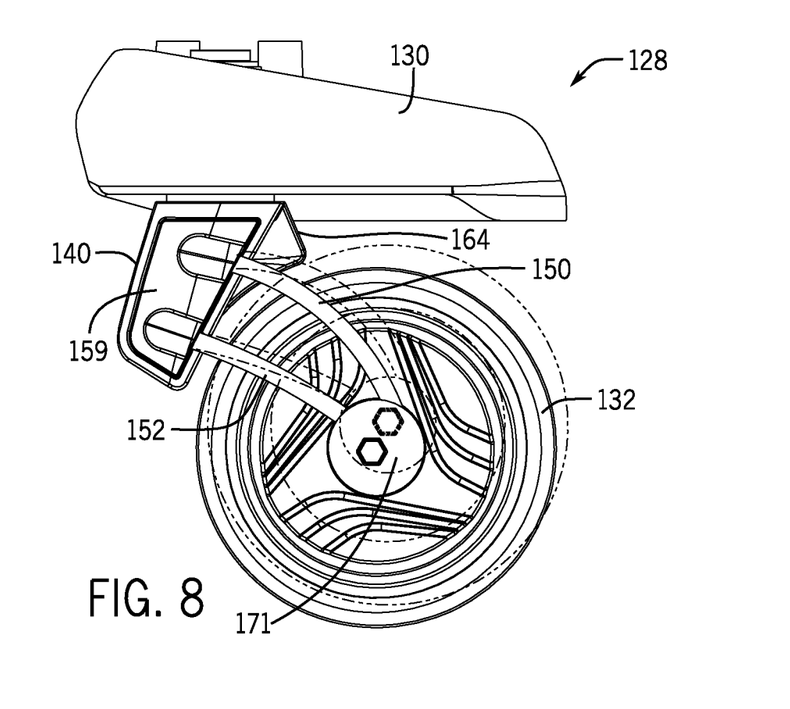
FIG. 8 is a schematic side elevation view of a wheel assembly shown in FIG. 3 of a luggage article shown in FIG. 1.

During operation, the elongate arms 154, 156 absorb, attenuate, or dampen impact loads (such as vibrational loads) imparted on the wheel 132, thereby reducing the forces transferred to the outer structure 105. Referring to FIG. 8, a wheel 132 is rotationally attached to the cantilevered wheel hub or mounts 158, 160 of the wheel bracket 134. The wheel 132 and the first and second arms 150, 152 are depicted in a non-deformed position in solid line, and in a deformed position in dashed line. As illustrated, the second or lower arm 152 may pivot upwardly towards the wheel mount 130 about a pivot axis defined by the support member 140 with little to no bending, thereby defining the travel path of the wheel 132. The first or upper arm 150 may resiliently deform along its length, permitting the upwardly movement of the wheel 132 while absorbing impact energy to provide more silent and smooth rolling.

The suspension member 142 may be formed from various materials. The elongate arms 150, 152, 154, 156 may be metallic, non-metallic, or both. In some implementations, the elongate arms 150, 152, 154, 156 are formed from spring steel, titanium, plastic, or other suitable materials. The elongate arms 150, 152, 154, 156 may be formed from solid or single-stranded wire. In one implementation, the elongate arms 150, 152, 154, 156 are formed from single-stranded, spring-steel wire. The third and fourth elongate arms 154, 156 may be mirror images of the first and second elongate arms 150, 152.

Figures 9, 10:
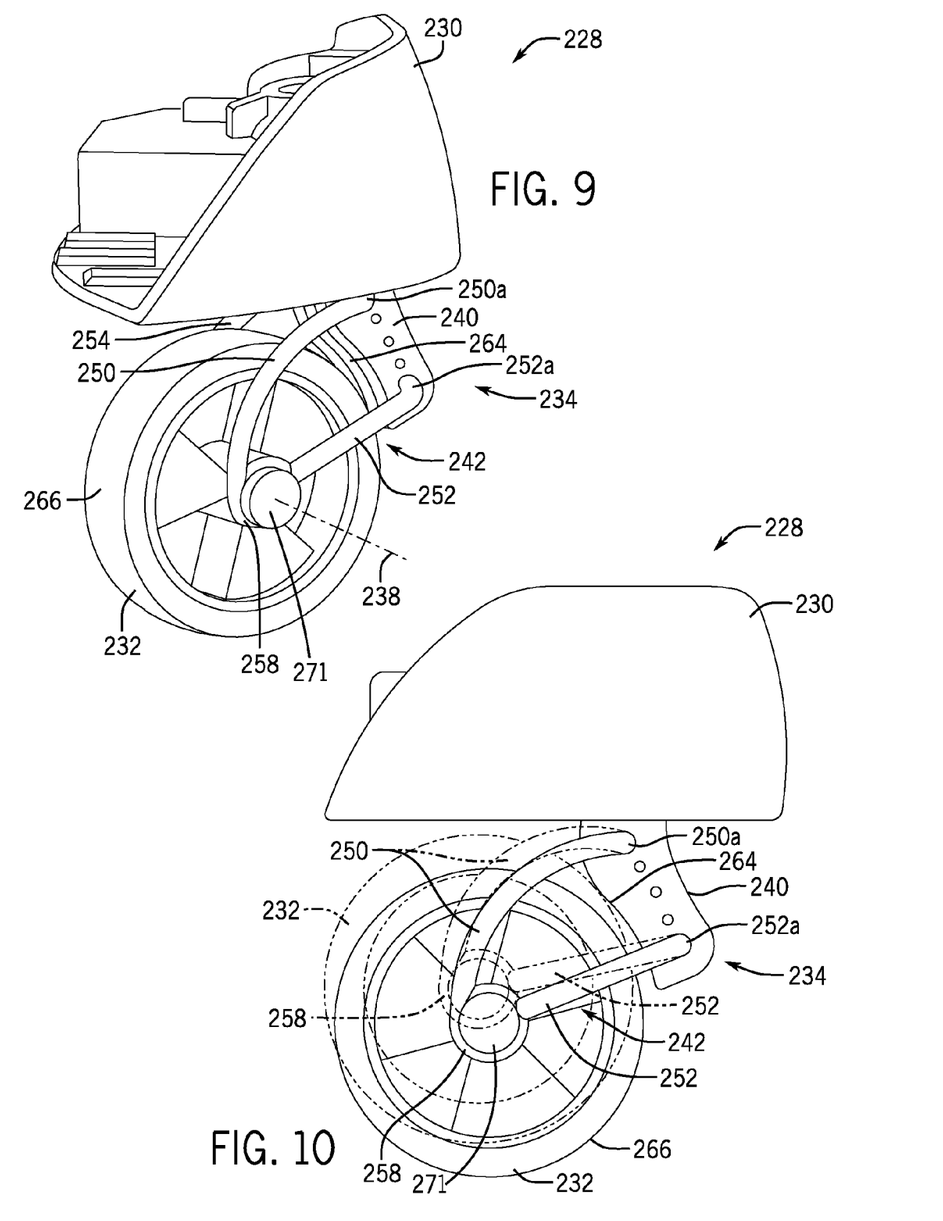
FIG. 9 is a schematic rear perspective view of a wheel bracket of a luggage article according to another embodiment of the invention.
FIG. 10 is a schematic side elevation view of a wheel bracket shown in FIG. 9.

Referring to FIGS. 9 and 10, an alternative wheel bracket 234 that may be used with the luggage article 100 is depicted. The reference numerals used in FIGS. 9 and 10 correspond to the reference numerals used in FIGS. 1-8 to reflect similar parts and components, except the first digit of each reference numeral is incremented by one. The alternative wheel bracket 234, forming part of the wheel assembly 228, has the same features and operation as the first example wheel bracket 134 depicted in FIGS. 1-8, except the cantilevered wheel mount 258 is circular and encloses the central axis 138 of the wheel 132 and the wheel bracket 234 does not include arm coverings 157 or a support member insert 159 to secure the arms 250, 252 to the support member 240. Accordingly, the preceding discussion of the features and operation of the wheel bracket 134 should be considered equally applicable to the alternative wheel bracket 234.

Referring to FIGS. 11-17, an alternative wheel bracket 334 that may be used with the luggage article 100 is depicted. The reference numerals used in FIGS. 11-17 correspond to the reference numerals used in FIGS. 1-8 to reflect similar parts and components, except the first digit of each reference numeral is incremented by two. The alternative wheel bracket 334, forming part of the wheel assembly 328, has the same features and operation as the first example wheel bracket 134 depicted in FIGS. 1-8, except the connection of the elongate arms 150, 152, 154, 156 to the support member 140 and to the wheel 132 is modified. Accordingly, the preceding discussion of the features and operation of the wheel bracket 134 should be considered equally applicable to the alternative wheel bracket 334.

Referring to FIGS. 11-15, the wheel bracket 334 may include an arm lock plate 359 that secures the elongate arms 350, 352, 354, 356 to the support member 340. The arm lock plate 359 may include a base portion 378 and four pins or prongs 380 projecting outwardly from the base portion 378. The pins 380 may be cantilevered from the base portion 380 such that each pin 380 has a fixed end and a free end. The free end of each pin 380 may include a barb 388 and may be referred to as a barbed end. The pins 380 may extend parallel to one another. The pins 380 may be received in bores 382 defined in the support member 340. The bores 382 may extend transversely to and intersect arm openings 384 formed in the support member 340. The arm openings 384 may receive the end portions 350a, 352a, 354a, 356a of the arms 350, 352, 354, 356 (see FIG. 15).

To attach the arms 350, 352, 354, 356 to the support member 340, the end portions 350a, 352a, 354a, 356a of the respective arms may be inserted into the arm openings 384 until a cut out or notch 386 formed in each of the end portions is aligned with the bores 382. Once the individual notches 386 and bores 382 are aligned, the arm lock plate 359 may be snapped into the support member 340 to lock the arms 350, 352, 354, 356 to the support member. For example, the arm lock plate 359 may be moved relative to the support member 340 until the pins 380 are aligned with the bores 382, which may extend perpendicularly to the arm openings 384. The pins 380 may be inserted into the bores 382 and through the notches 386 in the arms 350, 352, 354, 356, thereby interlocking the end portions 350a, 352a, 354a, 356a of the arms 350, 352, 354, 356 to the support member 340. Once assembled to the support member 340, the arm lock plate 359 may prevent the end portions of the arms from moving in a direction that is parallel to the wheel axis 338.

Figures 13, 14, 15:
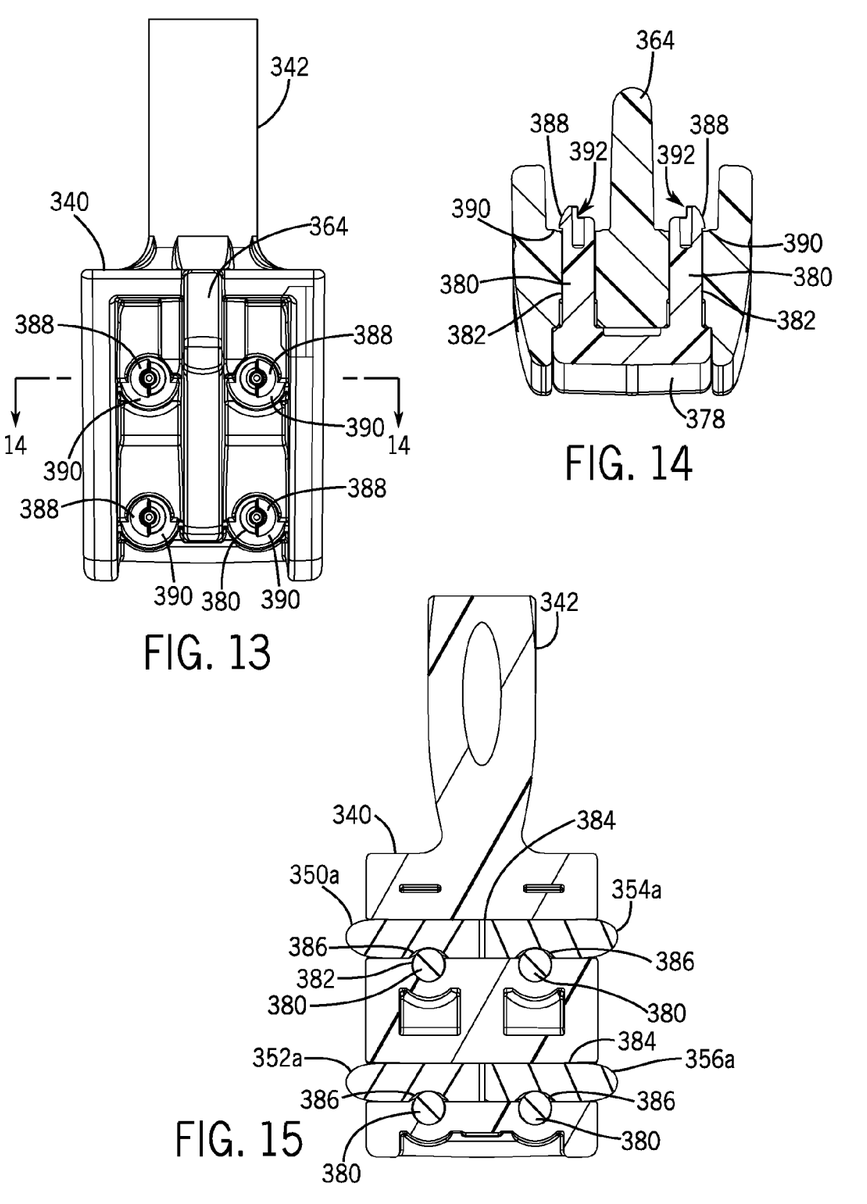
FIG. 13 is a schematic rear elevation view of a support member of a wheel bracket shown in FIG. 11.
FIG. 14 is a schematic cross-section view of a support member shown in FIG. 13 taken along the line 14-14 shown in FIG. 13.
FIG. 15 is a schematic cross-section view of a support member shown in FIG. 16 taken along the line 15-15 shown in FIG. 16.

One or more of the pins 380 may include a feature that secures the arm lock plate 359 to the support member 340. As shown in FIGS. 13 and 14, a barb 388 may be formed on one or more of the free ends of the pins 380. The barb 388 may engage a retaining shoulder 390 of the support member 340 to secure the arm lock plate 359 to the support member 340 and ensure the pins 380 remain interlocked with the arms 350, 352, 354, 356 during operation. A recess 392 may be formed in the free end of each pin 380 to facilitate insertion of the barbed ends of the pins 380 through the bores 382.

Figure 11:
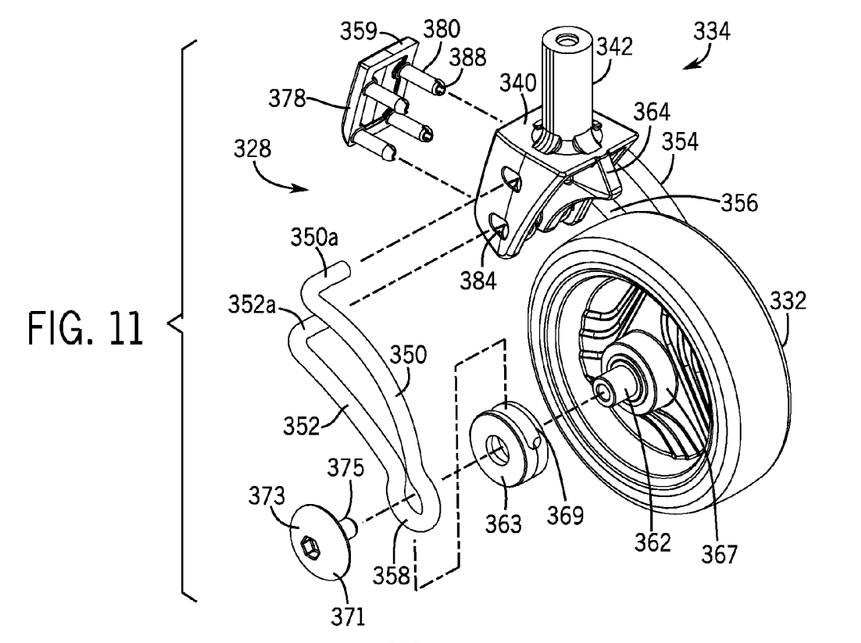
FIG. 11 is a schematic partially exploded, rear perspective view of a wheel bracket of a luggage article according to another embodiment of the invention.
Figure 12:
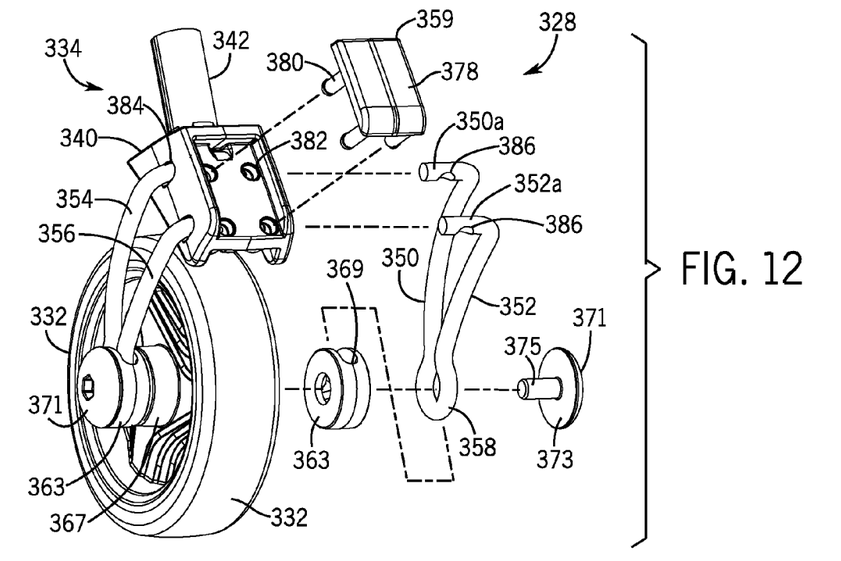
FIG. 12 is a schematic partially exploded, front perspective view of a wheel bracket shown in FIG. 11.
Figure 16:
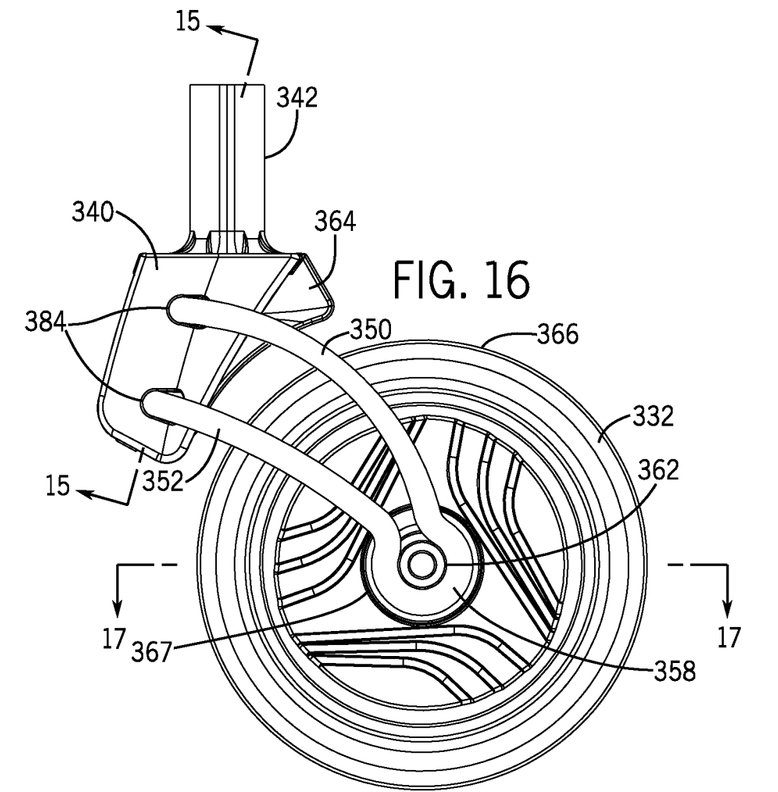
FIG. 16 is a schematic side elevation view of a wheel bracket shown in FIG. 11 without a hub fastener and a hub insert.

Referring to FIGS. 11, 12, 16, and 17, the attachment of the arms 350, 352, 354, 356 to the wheel axle 362 is depicted. Similar to other examples described above, the arms 350, 352, 354, 356 form wheel mounts 358, 360 that extend around a majority of an outer circumference of the wheel axle 362. As shown in FIGS. 11, 12, and 16, the arms 350, 352, 354, 356 are bent close to another such that the wheel mounts 358, 360 extend around about 270 degrees or more of the outer circumference of the wheel axle 362 to prevent the axle from slipping out of the wheel mount 358, 360 through the gap between the respective arms. Similar to previously-discussed examples, an optional hub insert 363 may hold the wheel mounts 358, 360 wrapped around the wheel axle 362 to prevent the wheel mounts 358, 360 from being dislodged from the axle 362. In implementations using a hub insert 363, the arms 350, 352 and 354, 356 may converge toward one another as the arms enter the hub insert 363 through a narrowed neck portion 369 of the insert 363. The arms 350, 352 and 354, 356 may wrap around a majority of the axle 362 radially between the axle 362 and the outer portion 365 of the insert 363.

Figure 17:
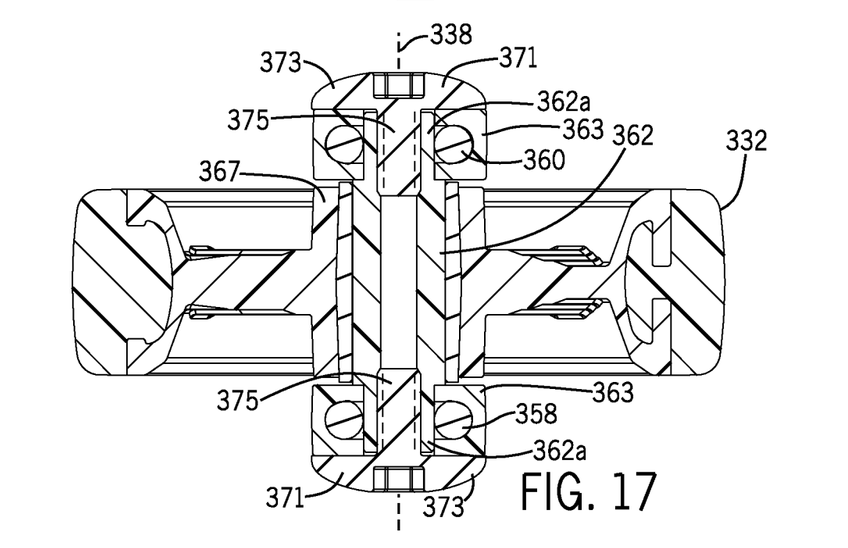
FIG. 17 is a schematic cross-section view of a wheel assembly of a wheel bracket shown in FIG. 11 taken along the line 17-17 shown in FIG. 16.

The wheel mounts 358, 360 may be positioned adjacent to opposing sides of the hub 367 of the wheel 332, and a shank portion 375 of a hub fastener 371 may engage an end portion of the axle 362 to axially secure the hub insert 363 to the axle 362. The hub fastener 371 may be threaded or pressed into engagement with the axle 362, for example. Each wheel mount 358, 360 may be mounted onto an end portion 362a of the wheel axle 362 such that the wheel mounts 358, 360 are located on opposing axial sides of the wheel 332. The wheel mounts 358, 360 may be secured axially between the head portion 373 of the hub fasteners 371 and the hub 367 of the wheel 332. The hub fasteners 371, the wheel mounts 358, 360, and the axle 362 may form a solid construction so the wheel may rotate freely about the axle 362. The hub fasteners 371, the wheel mounts 358, 360, and the wheel axle 362 may be coaxially aligned with one another along the central axis 338 of the wheel 332. As shown in FIGS. 16 and 17, the wheel mounts 358, 360 may be positioned within hub inserts 363. A washer may be positioned between the wheel mounts 358, 360 and the respective sides of the hub 367.

Relative to conventional luggage wheel brackets, the wheel bracket of the present disclosure generally results in quieter wheel operation with reduced weight. The wheel bracket generally absorbs or attenuates more shock and/or vibrational loads during rolling than conventional luggage wheel brackets, resulting in reduced noise and substantially silent rolling. In some implementations, the wheel bracket includes two spaced-apart, elongate arms that provide suspension to the wheel bracket due to one of the arms pivoting about a reference point and another of the arms bending, buckling, or flexing. The pivoting arm may be straight or substantially straight and may have a higher flexural rigidity or bending stiffness than the bending or buckling arm, which may be arcuate or curved. The arm with the lower flexural rigidity or bending stiffness may provide resilience as the arm with the higher flexural rigidity or bending stiffness pivots, thereby absorbing impact energy such as vibrational loads. The elongate arms may form a cantilevered mount for a wheel and may provide a shock absorbing function, resulting in less components and reduced weight relative to conventional luggage wheel brackets. Preferably the elongate arms are formed from wire.

The luggage wheel bracket of the present disclosure has broad application. For instance, the wheel bracket may be used with a single spinner wheel, a double spinner wheel, and/or an upright wheel. In implementations utilizing a single wheel, the suspension member may include a single pair of elongate arms extending along a common side of the wheel or a double pair of elongate arms extending along opposing sides of the wheel. In implementations utilizing a double wheel, the suspension member may include a single pair of elongate arms extending between the double wheels. The depicted arrangement of the arms (with the upper arm being arcuate or curved and the lower arm being straight or substantially straight) may be reversed with the upper arm being straight or substantially straight and the lower arm being arcuate or curved. Both elongate arms may be arcuate or curved, preferably with one arm defining a greater amount of curvature than the other arm. The depicted arrangement of the arms (with the upper and lower arms on each side of the wheel formed from a single piece of material) may be altered with the upper and lower arms on each side of the wheel formed from separate pieces of material and joined together by hub connectors or with the upper and lower arms on both sides of the wheel formed from a single piece of material. The luggage wheel bracket of the present disclosure may be used with a hard side suitcase, a soft side case, a hybrid side case, or various types of bags.

The apparatuses and associated methods in accordance with the present disclosure have been described with reference to particular embodiments thereof in order to illustrate the principles of operation. The above description is thus by way of illustration and not by way of limitation. In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A luggage article comprising:
   a plurality of walls together defining an outer structure of the luggage article; and
   one or more wheel assemblies attached to and extending from one of the walls, the one or more wheel assemblies comprising:
     a wheel bracket attached to and extending from one of the walls, the wheel bracket comprising a support member and a suspension member; and
     a wheel attached to the wheel bracket and having a central axis;
   wherein:
     the suspension member comprises a first arm and a second arm coupled separately to the support member and in a fixed relationship relative to the support member;
     the first and second arms extend from the central axis to the support member along a common side of the wheel and vertically-spaced apart from one another over at least a portion of the length of the first and second arms; and
     at least one of the first arm and the second arm resiliently deforms and bends along its length to absorb impact energy.

2. A luggage article as claimed in claim 1 wherein the first and second arms have different bending stiffness.

3. A luggage article as claimed in claim 1 wherein the first arm is positioned directly above the second arm.

4. A luggage article as claimed in claim 1 wherein the first and second arms converge toward one another as the first and second arms approach the central axis of the wheel.

5. A luggage article as claimed in claim 1 wherein the first and second arms form a cantilevered wheel mount that extends at least partially around the central axis of the wheel.

6. A luggage article as claimed in claim 5 wherein the cantilevered wheel mount is positioned within a hub insert, and wherein a wheel axle passes through the hub insert.

7. A luggage article as claimed in claim 1 wherein the first and second arms are solid or single-stranded wire.

8. A luggage article as claimed in claim 1 wherein the first arm is arcuate, and wherein the second arm is straight or substantially straight.

9. A luggage article as claimed in claim 1 wherein the first and second arms are formed as a single component.

10. A luggage article as claimed in claim 1 wherein the support member receives end portions of the first and second arms, and wherein the end portions are vertically-spaced apart from one another.

11. A luggage article as claimed in claim 10 wherein the support member defines a wheel abutment that is adapted to contact a circumferential surface of the wheel, thereby limiting the wheel travel of the wheel and the resilient deformation of the first and second arms.

12. A luggage article as claimed in claim 10 wherein the first and second arms each define a notch, and wherein the support member includes a support member insert having multiple prongs that engage the notches to interlock the first and second arms to the support member.

13. A luggage article as claimed in claim 1 wherein the wheel bracket further comprises third and fourth arms that extend along an opposing side of the wheel relative to the first and second arms.

14. A luggage article as claimed in claim 13 wherein at least the third and fourth arms are formed as a single component.

15. A luggage article as claimed in claim 1 wherein the wheel bracket and the wheel form part of a spinner wheel assembly, the wheel bracket including a rotation axis perpendicular to the central axis of the wheel.

16. A luggage article as claimed in claim 1, wherein the first arm resiliently deforms and bends along its length to absorb impact energy.

17. A wheel assembly for a luggage article, the wheel assembly comprising:
- a wheel bracket comprising a support member and a suspension member; and
- a wheel attached to the wheel bracket and having a central axis;

wherein:
- the suspension member comprises a first arm and a second arm coupled separately to the support member and in a fixed relationship relative to the support member;
- the first and second arms extend from the central axis to the support member along a common side of the wheel and vertically-spaced apart from one another over at least a portion of the length of the first and second arms; and
- at least one of the first arm and the second arm resiliently deforms and bends along its length to absorb impact energy.

18. The wheel assembly of claim 17 wherein the first and second arms have different bending stiffness.

19. The wheel assembly of claim 17 wherein the first and second arms are solid or single-stranded wire.

20. The wheel assembly of claim 17 wherein the first and second arms form a cantilevered wheel mount that extends at least partially around the central axis of the wheel.

21. The wheel assembly of claim 17 wherein the support member receives end portions of the first and second arms and wherein the end portions are vertically-spaced apart from one another.

* * * * *